United States Patent [19]

Arai et al.

[11] 4,051,932

[45] Oct. 4, 1977

[54] FLUID PRESSURE CONTROL SYSTEM FOR A HYDRAULIC TRANSMISSION WITH A LOCK-UP CLUTCH

[75] Inventors: Hajime Arai, Aichi; Kiyoshi Ohnuma, Toyota, both of Japan

[73] Assignee: Toyota Jidosha Kogyo Kabushiki Kaisha, Toyota, Japan

[21] Appl. No.: 634,039

[22] Filed: Nov. 21, 1975

[30] Foreign Application Priority Data

July 16, 1975   Japan .................................. 50-86919

[51] Int. Cl.² .................... F16D 37/00; F16H 47/00
[52] U.S. Cl. ........................................ 192/3.3; 74/733
[58] Field of Search ............... 74/732, 733, 752 R, 74/752 C, 843, 856, 867, 868, 869, 865; 192/3.28, 3.29, 3.3, 3.31

[56] References Cited

U.S. PATENT DOCUMENTS

| | | | |
|---|---|---|---|
| 3,058,373 | 10/1962 | Snoy | 192/3.3 |
| 3,241,399 | 3/1966 | Fisher | 74/732 |
| 3,255,642 | 6/1966 | Christenson | 74/645 |
| 3,524,523 | 8/1970 | Klimex | 74/732 |
| 3,857,302 | 12/1974 | Morris | 74/733 |

*Primary Examiner*—Samuel Scott
*Assistant Examiner*—Lance W. Chandler
*Attorney, Agent, or Firm*—Birch, Stewart, Kolasch & Birch

[57] ABSTRACT

A fluid pressure control system for a hydraulic transmission with a lock-up clutch including a lock-up clutch control valve which selectively supplies oil pressure for actuating the lock-up clutch. The lock-up clutch control valve being controlled by selective application of one of a plurality of servo fluid pressures for operating friction engaging means of a gear transmission, said selection of the servo fluid pressures being effected by a change-over valve composite in a changing-over manner.

2 Claims, 4 Drawing Figures

FIG. 4

FLUID PRESSURE CONTROL SYSTEM FOR A HYDRAULIC TRANSMISSION WITH A LOCK-UP CLUTCH

BACKGROUND OF THE INVENTION

1. Field of the Invention

The present invention relates to a fluid pressure control system for a hydraulic transmission with a lock-up clutch.

2. Description of the Prior Art

The torque converter which is now widely used for a hydraulic transmission for automobiles, comprises an impeller connected to an engine output shaft, a turbine connected to an input shaft of a gear transmission mechanism and a stator adapted to deflect the flow of fluid which returns from said turbine to said impeller in order to effect a determined torque conversion between the engine output shaft and the input shaft of the gear transmission mechanism according to a difference between the rotational speed of said output shaft and said input shaft while transmitting rotational power by means of fluid dynamics. In this torque converter, there exists inevitably a slippage between the impeller and the turbine even under the optimum operating condition where the rotational speed of the turbine has almost approached the rotational speed of the impeller, thereby lowering the power transmission efficiency when compared with the direct transmission mechanism of a mechanical clutch, resulting in an increase in the fuel consumption of the automobile. This slippage results in problems regarding economy of petroleum and exhaust gas purification. In order to solve this problem, a hydraulic transmission system equipped with a lock-up clutch has been proposed. One such lock-up clutch system is described in U.S. Pat. No. 3,255,642, said system including in parallel a hydraulic transmission, such as a torque converter, and a friction clutch, the latter being adapted to be selectively actuated by fluid pressure under the control of an oil pressure control system. The oil pressure control system effects direct transmission according to the operational condition of the automobile so that the operational advantages of both the hydraulic transmission and the direct mechanical clutch are obtained.

In order to accomplish an optimum operation of the two abovementioned types of transmissions the friction clutch must be selectively actuated depending upon the automobile operating condition in the hydraulic transmission. Also, it is necessary that the friction clutch is actuated as long as possible to avoid power loss by the torque converter in the operating condition. When torque conversion is not required, the friction clutch is temporarily disengaged when speed shifting is effected so that an abrupt change of torque due to shifting of the gear transmission is absorbed by the torque converter for effecting smooth speed shifting. For effecting such selective engagement or disengagement of the friction clutch according to the operational condition of the automobile, particularly the shifting of the gear transmission mechanism, the fluid pressure control system according to the aforementioned U.S. Patent incorporates a throttling means in a passage for supplying a servo fluid pressure to a friction engaging means of a gear transmission mechanism, whereby a pressure difference is generated on opposite sides of the throttling means when fluid is supplied to the friction engaging means through said throttling means in the shifting of speed. The pressure difference is employed for actuating a fluid pressure change-over valve which effects disengagement of the friction clutch. With the completion of the speed shifting, the flow of fluid to the friction engaging means stops, whereby the abovementioned pressure difference disappears, whereby the friction clutch is again put into its actuating condition. However, in this structure of providing a throttling means in the fluid passage extending to the friction engaging means, in view of the possibility of a large alteration in fluid temperature according to the operational condition of the transmission, such as from −30° to 130° C, a large alteration in the viscosity of fluid, the throttling ratio of the throttling means must be relatively large if a sufficient pressure difference is to be generated in any operating condition and. If a large throttling ratio is employed, a large time delay is suffered between the dispatch of an instruction signal for speed shifting and the actuation of the friction engaging means, resulting in giving an uncomfortable speed shift feeling to the driver or passenger. Therefore, this system involves two contradictory conditions which must be satisfied, thus making it relatively difficult to practice this system.

SUMMARY OF THE INVENTION

Therefore, it is the primary object of the present invention to solve the abovementioned problem and to provide an improved fluid pressure control system which is able to disengage the friction lock-up clutch in a favorable manner on the occasion of speed shifting without providing a throttling means in the midst of the fluid passage extending to the friction engaging means of a gear transmission mechanism.

In order to accomplish the abovementioned object, in a fluid pressure control system according to the present invention for a hydraulic transmission with a lock-up clutch of the type which comprises a hydraulic transmission device for hydraulically coupling an input member with an output member, a lock-up clutch for directly mechanically coupling said input member with said output member and a fluid passage for selectively supplying fluid pressure to said lock-up clutch, wherein said clutch is adapted to effect direct mechanical coupling of said input and output members when fluid pressure is supplied through said fluid passage. The system comprises a fluid pressure source, a lock-up clutch control valve having at least one actuating port and being adapted to take a first shift condition of connecting said fluid passage with said fluid pressure source and a second shift condition of connecting said fluid passage with an exhaust passage, according to whether or not a fluid pressure is supplied to said actuating port, and a change-over valve composite adapted to be actuated by a plurality of control fluid pressures generated by a transmission control system so as to control supply of a selected one of said control fluid pressures to said actuating port of said lock-up clutch control valve depending upon the balance among said plurality of control fluid pressures.

The fluid transmission with a lock-up clutch disclosed in U.S. Pat. No. 3,255,642 or its divisional application, U.S. Pat. No. 3,338,358, comprises a hydraulic torque converter for hydraulically coupling an input member with an output member and a lock-up clutch for directly mechanically coupling said input member with said output member. The hydraulic torque converter is provided with its own fluid inlet and outlet ports as is the conventional torque converter-type hydraulic transmission so that the torque converter maintains its normal operation by being supplied with a flow of fluid which constantly traverses therethrough, while the lock-up clutch is provided with a third port through which a fluid pressure is selectively supplied when the lock-up clutch is to be actuated. Although this hydraulic transmission with a lock-up clutch will operate satisfactorily in the manner that the basic power transmission is effected through hydraulic transmission by the torque converter, and the lock-up clutch is selectively actuated depending upon the operational condition of the automobile for the purpose of avoiding power loss in the torque converter. This system involves a problem in that the third port is required for the lock-up clutch in addition to the two ports required for traversing fluid through the torque converter and, furthermore, in order to engage the lock-up clutch by actuating the hydraulic mechanism for the lock-up clutch against the fluid pressure supplied through the torque converter, the fluid pressure supplied to said third port must be higher than that supplied through the torque converter, thereby generating problems in the design of the oil pressure system.

In view of the abovementioned problems, we have proposed in the copending application Ser. No. 634,040 filed simultaneously with the present application and assigned to the same assignee, an improved hydraulic transmission with a lock-up clutch. The transmission comprises a hydraulic torque converter for hydraulically coupling an input member with an output member, a lock-up clutch for mechanically coupling said input member with said output member, and first and second ports. Wherein, as fluid is supplied from said first port and exhausted from said second port, the fluid is traversed through said torque converter while maintaining normal operation of said torque converter with said lock-up clutch being disengaged and when fluid is supplied from said second port and is exhausted from said first port, said lock-up clutch is engaged to directly transmit rotational power from said input member to said output member.

Therefore, another object of the present invention is to provide a fluid pressure control system which does not depend upon providing a throttling means in the fluid pressure supply passage extending to the friction engaging means of a gear transmission mechanism. The present invention is particularly adapted for use in combination with the hydraulic transmission with a lock-up clutch as proposed in the copending application Ser. No. 634,040, filed Nov. 21, 1975.

According to the present invention, the abovementioned objects are accomplished by a fluid pressure control system for the fluid transmission with a lock-up clutch of the type disclosed in U.S. Application Serial No.

The system includes a fluid pressure source, a lock-up clutch control valve having at least one actuating port and being adapted to undergo a first shift condition which corrects said second port with said fluid pressure source while connecting said first port with an exhaust passage. Also, the system includes second shift condition which connects said first port with said fluid pressure source while connecting said second port with said exhaust passage according to whether or not a fluid pressure is supplied to said actuating port. In addition, the system includes a change-over valve composite adapted to be actuated by a plurality of control fluid pressures generated by a transmission control system so as to control the supply of a selected one of said control fluid pressures to said actuating port of said lock-up clutch control valve depending upon the balance among said plurality of control fluid pressures.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
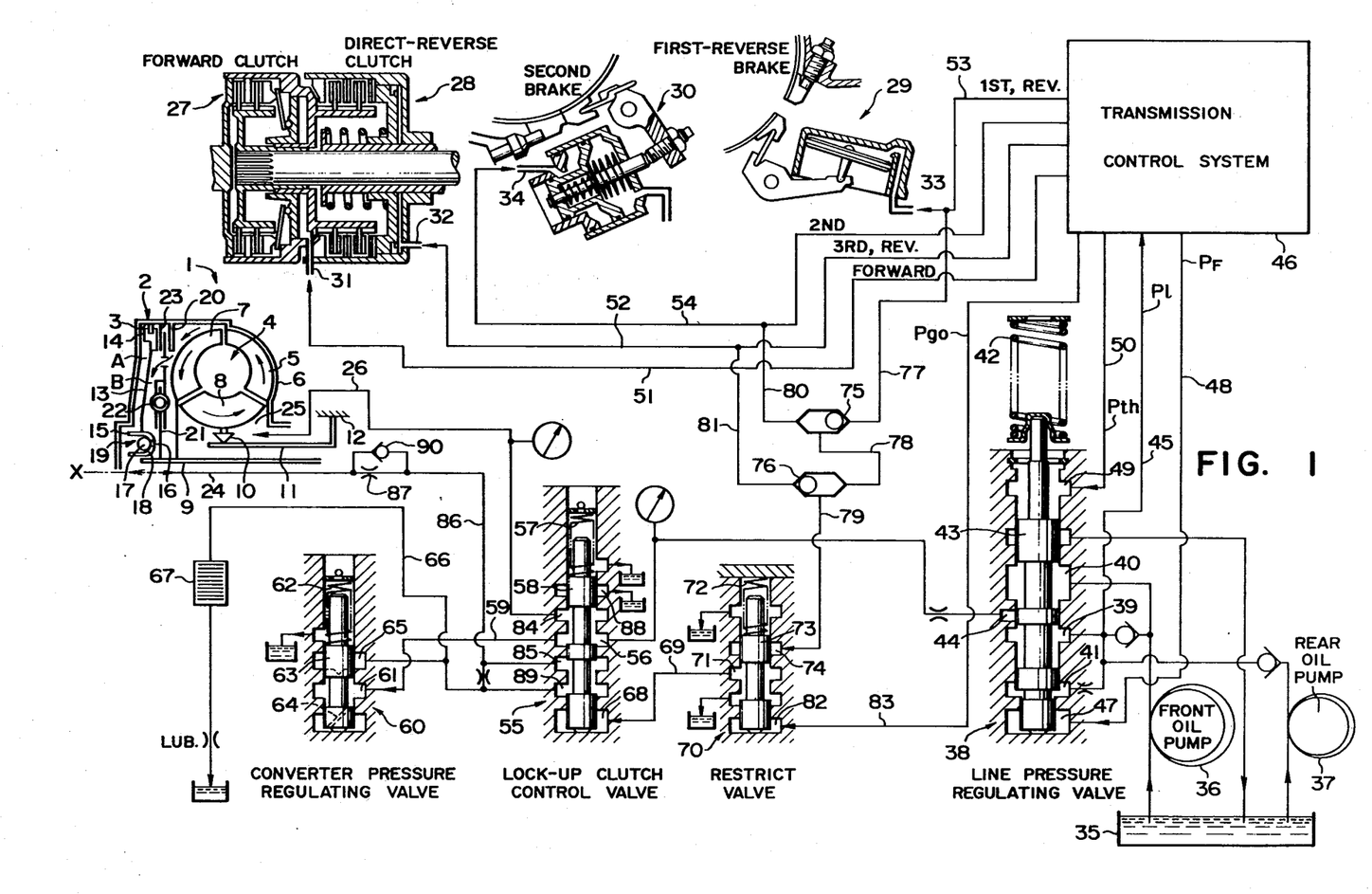
FIG. 1 is a diagrammatical view showing an example of an automobile transmission system incorporating an embodiment of the oil pressure control system according to the present invention.

Referring first to FIG. 1, the hydraulic transmission with a lock-up clutch generally designated by reference numeral 1 is of the type disclosed in the copending U.S. application Ser. No. 634,040 filed Nov. 21, 1975 which comprises a housing 2 adapted to be rotated around axis X by an engine output shaft (not shown) located at its forward (leftward in the figure) position. The housing 2 encloses principal portions of the hydraulic transmission with a lock-up clutch and simultaneously constitutes a principal transmission element by itself. It includes a cylinder 3 for the lock-up clutch by its front portion of an impeller housing 6 for constituting an impeller 5 of a hydraulic torque converter generally designated by 4 at its rear portion. The torque converter 4 includes a turbine 7 adapted to be driven by the impeller 5 and a stator 8 adapted to return fluid delivered from the turbine to the impeller by giving a required deflection to the fluid. The turbine 7 is supported by an output shaft 9 and the stator 8 is supported by a sleeve 11 which is co-axial with the output shaft 9 by way of a one-way clutch 10. As diagrammatically shown in FIG. 1, the sleeve 11 is fixedly supported by an outside stationary housing 12. Within said cylinder 3 defined by the front portion of the housing 2, a flexible disc 13 is provided with an annular piston element 14 mounted around a peripheral portion thereof, said piston element is in fluid-tight, slidable engagement with an inner surface of the cylinder 3. The flexible disc 13 is provided with a hub 15 at its central portion. The hub 15 is provided with an opening 16, in which is incorporated a check valve 19 composed of a ball valve member 17 and a valve seat 18. An annular clutch element 20 is extended radially inward from an inner peripheral portion of the housing 2, and a clutch disc 21 having a peripheral portion which overlies said annular clutch element is supported by the output shaft 9 and is fixed against relative rotation by a spline engagement. A buffering structure comprising a plurality of compression coil springs 22 extending in a circumferential direction is incorporated between the outer peripheral portion and the central hub of the clutch disc 21 thereby giving a buffering effect to the power transmission from the outer peripheral portion of the clutch disc to the output shaft 9, reducing the shock caused at the actuation of the clutch. Between the annular piston element 14 provided at the outer peripheral portion of the flexible disc 13 and the outer peripheral portion of the clutch disc 21, a plate element 23 is provided in a manner to be freely movable in axial directions but fixed against rotation relative to the housing 2. The internal space of the cylinder 3 defined by the front portion of the housing 2 is divided by the flexible disc 13 into a chamber A positioned forward (leftward in the figure) thereof and a chamber B positioned rearward (rightward in the figure) thereof. The chamber A is connected with a fluid passage 24 provided along a central portion of the output shaft 9, while the chamber B is connected with a fluid passage 26 which opens to a pump inlet space 25 provided at a rear portion thereof. The chamber A and the chamber B are connected with each other through the opening 16 provided in the hub 15 of the flexible disc 13 but, due to the provision of the check valve 19, fluid flow from chamber B to chamber A is permitted while fluid flow from chamber A to chamber B is prevented. Numerals 27, 28, 29 and 30 designate a forward clutch, a direct-reverse clutch, a first reverse brake and a second brake, respectively. Each of these members is incorporated in a gear transmission mechanism. These friction engaging means are provided with ports 31, 32, 33 and 34, respectively, and are adapted to be actuated into engaged or tightened condition when fluid pressure is supplied to said ports, while they are actuated into disengaged or losened condition when said fluid pressure is removed. The gear transmission mechanism in the shown system is adapted to effect three stage forward and one stage rearward speed shifting and. As is well known in the art, forward 1st speed range is attained when the forward clutch 27 is engaged with the first-reversed brake 29 being tightened; forward, 2nd speed range is attained when the forward clutch 27 is engaged with the second brake 30 being tightened; forward 3rd speed range is attained when the forward clutch 27 and the direct-reverse clutch 28 are engaged; and reverse range is attained when the direct-reverse clutch 28 is engaged with the first-reverse brake 29 being tightened.

The hydraulic transmission with a lock-up clutch 1 and the friction engaging means, such as the forward clutch 27, the direct-reverse clutch 28, the first-reverse brake 29, the second brake 30, etc. are, actuated by fluid or oil pressure pumped up from a reservoir 35 by a front oil pump 36 or a rear oil pump 37 by way of a fluid pressure control system explained hereinbelow. The front oil pump 36 is driven by the transmission input shaft, while the rear oil pump 37 is driven by the transmission output shaft, these two pumps being adapted to be changed over as required depending upon the operational condition of the system. The fluid pressure delivered by these pumps is supplied to ports 39, 40 and 41 of a line pressure regulating valve 38. The line pressure regulating valve 38 is well known in the art and comprises a spool 43 which is engaged in a cylinder having a plurality of ports like the port 39, etc., and is resiliently urged in one direction (downward in the figure) by a compression coil spring 42. The line pressure regulating valve 38 is adapted to generate a line pressure of a predetermined level in a fluid passage 45 by the valve spool 43 being shifted upwards due to an increase in the pump delivery pressure supplied to the port 41 thereby releasing a portion of the pump delivery fluid to the port 44, said line pressure being supplied to a transmission control system. The transmission control system is already known in various forms as, for example, disclosed in copending U.S. application Ser. No. 586,809 assigned to the same assignee as the present application. The line pressure regulating valve is supplied with a fluid pressure of a predetermined level at its port 47 from the transmission control system 46 by way of a passage 48 only when the transmission is in the forward range, whereby it is effected that the line pressure is maintained higher by a predetermined amount in the reverse range where such a pressure is not supplied when compared with the forward range where said pressure is supplied. Furthermore, a port 49 of the line pressure regulating valve is supplied with a throttle pressure from the transmission control system 46 by way of a passage 50, said throttle pressure being increased according to the opening of the throttle valve. This throttle pressure acts on the valve body 43 in a manner to increase the line pressure, whereby the line pressure is increased according to the opening of the throttle valve.

The transmission control system 46 selectively supplies oil pressure to the port 31 of the forward clutch 27 by way of a passage 51, to the port 32 of the direct-reverse clutch 28 by way of a passage 52, to the port 33 of the first-reverse brake 29 by way of a passage 53 and to the port 34 of the second brake 30 by way of a passage 54, respectively, so that predetermined friction engaging means are actuated to establish a predetermined operational range.

The fluid pressure taken at the port 44 of the line pressure regulating valve 38 is supplied to a port 56 of a lock-up clutch control valve 55. The lock-up clutch control valve 55 comprises a spool 58 slidably received in a cylinder having a plurality of ports like the port 56, etc., and resiliently urged in one direction (downward in the figure) by a compression coil spring 57. The port 56 is connected to a port 61 of a converter pressure regulating valve 60 by way of a passage 59, whereby the fluid pressure at the port 56 is regulated at a predetermined converter pressure. The converter pressure regulating valve 60 comprises a spool 63 received in a cylinder having a plurality of ports like the port 61, etc., and resiliently urged in one direction (downward in the figure) by a compression coil spring 62. The oil pressure applied to the port 61 of the converter pressure regulating valve 60 is applied on the lower end portion of the valve spool 63 by way of a fluid passage 64 formed in a part of the valve spool 63 thereby urging the valve spool 63 upward against the force of the compression coil spring 62 so that when the fluid pressure existing in the port 61 increases beyond a predetermined level, a portion of the fluid is released from a port 65 through a passage 66, thus maintaining the fluid pressure in the port 61 or the passage 59 and the port 56 of the lock-up clutch control valve 55 at a predetermined level, i.e., the converter pressure. The fluid which has been released through the passage 66 is transferred to a lubricating system through an oil cooler 67.

A port 68 of the lock-up clutch control valve 55 is connected with a port 71 of a restrict valve 70 by way of a passage 69. The restrict valve 70 comprises a spool 73 received in a cylinder having a plurality of ports like the port 71, etc., and resiliently urged in one direction (downward in the figure) by a compression coil spring 72. A port 74 of the restrict valve 70 is adapted to be supplied with either the fluid pressure in the passages 52–54 by way of a first change-over valve 75 and a second change-over valve 76. In more detail, when the gear transmission mechanism is shifted to the forward, 1st speed range, the fluid pressure supplied from the passage 53 through a passage 77 to the change-over valve 75 drives a ball in the change-over valve leftward and then reaches the change-over valve 76 by way of a passage 78, whereupon the fluid pressure drives a ball in the changeover valve 76 leftward and finally reaches the port 74 of the restrict valve 70 by way of a passage 79. When the transmission control system is shifted to the forward, 2nd speed range, the fluid pressure delivered through the passage 54 reaches the change-over valve 75 by way of a passage 80 and drives the ball of the change-over valve 75 rightward thereby further transmitting through the passage 78 to the change-over valve 76, whereupon it drives the ball of the change-over valve 76 leftward and finally reaches the port 74 through the passage 79. When the transmission control system 46 is shifted to the forward, 3rd speed range, the fluid pressure supplied through the passage 52 is transmitted to the change-over valve 76 by way of a passage 81 thereby driving the ball of the change-over valve 76 rightward, whereupon the fluid pressure is transmitted to the port 74 through the passage 79. When the transmission control system 46 is shifted to the reverse range, the opposite sides of the change-over valve 76 are supplied with the fluid pressures from the passages 53 and 52. However, since the vehicle speed is low in the reverse range, the restrict valve 70 is maintained at its downward shifted position as shown in FIG. 1, making it immaterial as to the pressure supplied to the port 74.

A port 82 of the restrict valve 70 is supplied with the governor pressure from the transmission control system 46 through a passage 83, said governor pressure increasing according to the vehicle speed.

Figure 2:
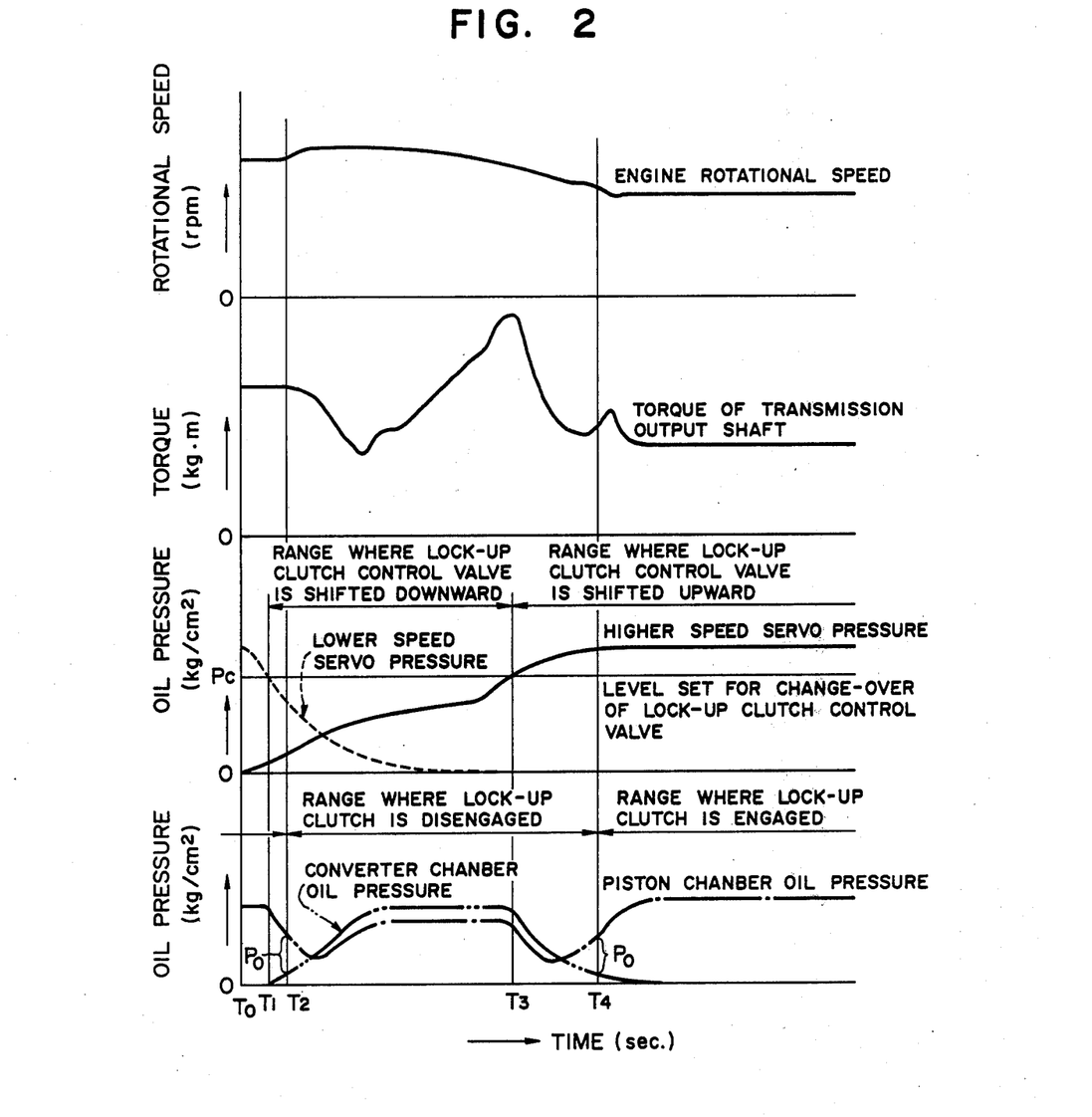
FIG. 2 is a graph for explaining the operation of the transmission system shown in FIG. 1.

Referring next to FIG. 2, the operation of the system shown in FIG. 1 will be explained with reference to, for example, a case where a vehicle running in the forward, 2nd speed range is shifted up to the forward, 3rd speed range. When the vehicle is running in the forward, 2nd speed range, fluid pressure is delivered from the transmission control system 46 to the fluid passage 51 and 54. The fluid pressure supplied to the passage 54 is transmitted through the passage 80, the change-over valve 75, the passage 78 and the change-over valve 76 to the port 74 of the restrict valve 70. In this operating condition, the vehicle is generally running at a high speed and, therefore, the governor pressure supplied through the passage 83 is sufficiently high, whereby the valve spool 73 of the restrict valve 70 is urged upward against the action of the compression coil spring 72 so that the port 74 and 71 are in communication with each other. Therefore, the oil pressure supplied to the port 74 from the passage 54 is transmitted through the passage 69 to the port 68 of the lock-up clutch control valve 55 thereby urging the valve spool 58 upward against the action of the compression coil spring 57, thus isolating the port 56 from a port 84 while connecting the port 56 to a port 85. In this condition, the converter pressure existing in the port 56 is transmitted through a passage 86 and a throttling orifice 87 provided in the passage 86 thereof to the fluid passage 24 of the hydraulic transmission with a lock-up clutch 1, said pressure being applied to the chamber A thereby biasing the flexible disc 13 rightward in the figure, so that the annular piston element 14 provided at its outer peripheral portion of the clutch disc 21 is biased against the annular clutch element 20, thus maintaining the lock-up clutch in the engaged condition. In this condition, therefore, the rotary power transmitted from the engine output shaft to the housing 2 passes by the torque converter 4 to be directly transmitted to the output shaft 9. In this condition, the interior of the chamber B including the torque converter 4 is connected through the passage 26 and the port 84 of the lock-up clutch control valve 55 to its drain port 88, whereby the oil pressure in the chamber B is reduced to substantially zero. Starting from this operating condition, it is now assumed that at time To in FIG. 2, the transmission control system 46 was shifted to the forward, 3rd speed range. From this instant, the lower speed servo fluid pressure (in this case, the fluid pressure existing in the passage 54) acting on the lower speed friction engaging means begins to decrease as shown in FIG. 2, while on the other hand the higher speed servo fluid pressure (in this case, the fluid pressure existing in the passage 52) acting on the higher speed friction engaging means begins to increase. At the time T1, when the lower speed servo fluid pressure reaches pressure Pc, the fluid pressure which urges the valve spool 58 of the lock-up clutch control valve 55 upward against the action of the compression coil spring 57 reaches its limit and, thus, the valve spool 58 is shifted downward by the action of the spring 57. Now, the port 85 is connected with a port 89, whereby the fluid pressure in the chamber A is exhausted through the passage 24, a check valve 90, the passage 86, the port 85, the port 89 and the exhaust passage 66, such decrease of the fluid pressure is shown in FIG. 2. At time T2, when the difference between the fluid pressure in the piston chamber and that in the converter chamber has decreased down to Po, the torque transmission capacity of the lock-up clutch becomes lower than the transmission torque, whereby at this point in time, the lock-up clutch is disengaged. On the other hand, the higher speed servo fluid pressure (in this case, the fluid pressure in the passage 52) continues to increase and proceeds through the passage 81 to reach the change-over valve 76, whereupon it drives the ball rightward to further proceed through the passage 79 until it reaches the port 74 of the restrict valve 70. The fluid pressure is then passed to the port 71 and is transmitted through the passage 69 to the port 68 of the lock-up clutch control valve 55. When the fluid pressure in the port 68 has reached the pressure Pc, the valve spool 58 of the lock-up clutch control valve 55 is again shifted upward. In the meantime, the fluid pressure in the converter chamber B is gradually increased to maintain the normal operation of the torque converter. In this connection, it will be noted that since the fluid supplied to the converter chamber B through the passage 26 is passed to the piston chamber A through the opening 16 provided in the hub 15 of the flexible disc to be returned through the passage 24, the fluid pressure in the piston chamber begins to increase from the half way thereof as shown in FIG. 2, said pressure being maintained at a pressure lower than that in the converter chamber by an amount determined by the throttling ratio of the opening 16. After the time T3 when the higher speed servo fluid pressure reaches pressure Pc and shifts the valve spool 58 again upward in the lock-up clutch control valve 55, the converter chamber pressure is again decreased. On the other hand, although the piston chamber pressure temporarily decreases for a small period according to the decrease of the converter chamber pressure, the piston chamber pressure begins to increase due to the fluid pressure gradually supplied through the passage 86 and the throttling means 87. If the difference between the piston chamber pressure and the converter chamber pressure exceeds Po (time T4) the capacity of the lock-up clutch again exceeds the transmission torque, whereupon the transmission by the lock-up clutch to bypass the torque converter is resumed.

Thus, in the midst of shifting from the 2nd speed range to the 3rd speed range, in the period between the time points T2 and T4, the hydraulic transmission by the torque converter with the lock-up clutch being disengaged is effected, this temporary disengagement of the lock-up clutch provides a smooth shifting without a shift shock.

FIG. 2 shows in addition the performance of the torque of the transmission output shaft and the rotational speed of the engine relative to the shifting condition of the fluid pressure control system. Particularly with reference to the torque of the transmission output shaft, it will be noted that a peak in which the output torque temporarily increases is caused due to speed shifting. If the lock-up clutch is not disengaged in this period, the amplitude of the peak will become so large that it will cause discomfort to the driver and passengers.

When the transmission is shifted from the 3rd speed range to the 2nd speed range, the oil pressure applied to the port 68 of the lock-up clutch control valve 55 is changed-over from the servo oil pressure supplied from the passage 52 to that supplied from the passage 53 thereby effecting a similar operation as that explained in the above with reference to FIG. 2 with similar temporary disengagement of the lock-up clutch during the shifting. A substantially similar operation is also performed in the shifting between the 1st speed range and 2nd speed range.

Figure 3:
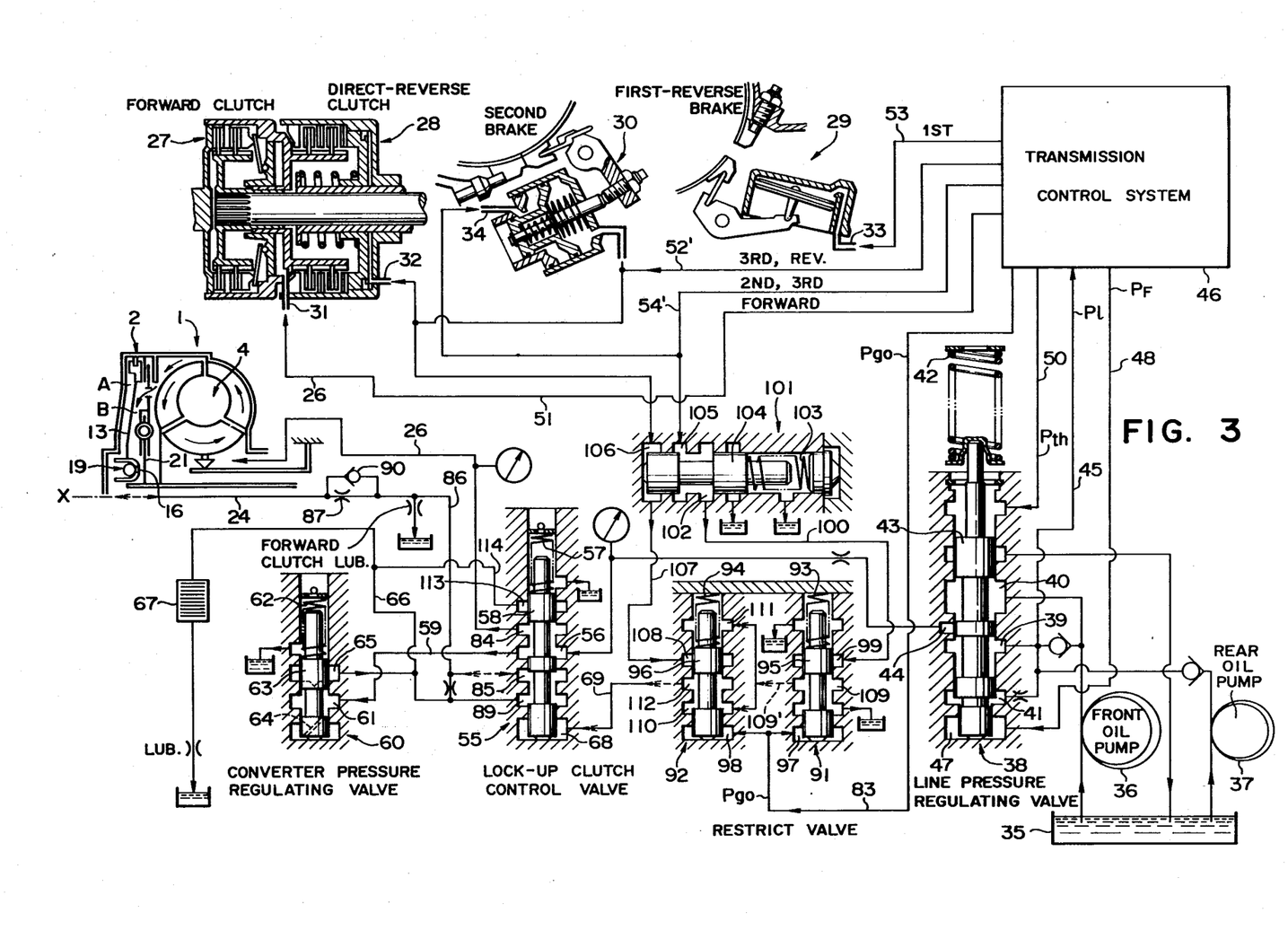
FIG. 3 is a diagrammatical view showing an example of an automobile transmission system incorporating another embodiment of the oil pressure control system according to the present invention; and, FIG. 4 is a graph for explaining the operation of the system shown in FIG. 3.

FIG. 3 is a view similar to FIG. 1 showing a transmission system incorporating another embodiment of the present invention. The portions in FIG. 3 corresponding to those shown in FIG. 1 are designated by the same reference numerals and, since these portions operate substantially in the same manner as those shown in FIG. 1, detailed explanations for those portions will be omitted for the purpose of simplicity.

In the embodiment shown in FIG. 3, as a substitute for the restrict valve 70 in FIG. 1, two restrict valves 91 and 92 are provided. These restrict valves comprise valve spools 95 and 96 slidably received in cylinders each having a plurality of ports and resiliently urged in one direction, (downward in the figure) by compression coil springs 93 and 94 respectively. Ports 97 and 98 of these valves are provided with the governor pressure through the passage 83, said governor pressure acting at the lower end portions of the valve spools 95 and 96 to urge them upward in the figure against the action of the compression coil spring 93 and 94, respectively. In this case, the restrict valves 91 and 92 are differently designed so that their valve spools are biased upward at different levels of the governor pressure. A port 99 of the restrict valve 91 is connected through a passage 100 to a port 102 of a change-over valve 101. The change-over valve 101 comprises a spool 104 slidably received in a cylinder having a plurality of ports like the port 102, etc., and resiliently urged in one direction (leftward in the figure) by a compression coil spring 103. A port 105 of the change-over valve 101 is adapted to be supplied with oil pressure through a passage 54' in the forward, 2nd speed and 3rd speed ranges, while a port 106 of the change-over valve 101 is adapted to be supplied with fluid pressure through a passage 52' in the forward, 3rd speed range and the reverse range.

The operation of the system shown in FIG. 3 will be explained with reference to FIG. 4.

When the gear transmission is shifted to the forward, 1st speed range, neither the port 105 nor the port 106 of the change-over valve 101 is supplied with fluid pressure. Therefore, the port 99 of the restrict valve 91 is not supplied with fluid pressure and, similarly, the passage extending from the port 106 of the change-over valve 101 through a passage 107 to a port 108 of the restrict valve 92 is not supplied with fluid pressure either. In this condition, therefore, the port 68 of the lock-up clutch control valve 55 is not supplied with fluid pressure regardless of the vehicle speed or the level of the governor pressure. Therefore, the converter pressure existing in the port 56 of the lock-up clutch control valve is transmitted through the passage 26 to the converter chamber B, while the piston chamber A is exhausted through the passage 86, the ports 85 and 89 of the lock-up clutch control valve 55 and the passage 66. Therefore, in the forward, 1st speed range, the lock-up clutch is not engaged and the power transmission is exclusively effected through the torque converter.

In the forward, 2nd speed range, fluid pressure is supplied to the port 105 of the change-over 101 through the passage 54', said fluid pressure being supplied through the passage 100 to the port 99 of the restrict valve 91. If the governor pressure increases beyond a first predetermined level due to increase of the vehicle speed under this condition, the valve spool 95 of the restrict valve 91 is biased upward by the governor pressure acting at its lower end against the action of the compression coil spring 93. With the valve spool 95 biased upward, the fluid pressure supplied to the port 99 is transmitted through a port 109 and a passage 109' to be simultaneously supplied to ports 110 and 111 of the restrict valve 92. Therefore, the valve spool 96 of the restrict valve 92 is maintained at its downward shifted position as shown in the figure, regardless of the level of the governor pressure acting at its lower end. In this condition, the fluid pressure applied to the port 110 is transmitted through a port 112 and the passage 69 to the port 68 of the lock-up clutch control valve 55 thereby shifting the valve body 58 upward in FIG. 3. Thus, the converter pressure existing in the port 56 is then supplied to the clutch chamber A through the passage 86 and the throttling orifice 87, while the fluid pressure in the converter chamber B is released through the passage 26, the port 84, a port 113 and a passage 114 toward the exhaust passage 66 thereby establishing the direct mechanical transmission by the lock-up clutch.

When the gear transmission is shifted to the forward, 3rd speed range, fluid pressure is applied to both of the ports 105 and 106 of the change-over valve 101. In this case, the valve body 104 of the change-over valve 101 is biased rightward in the figure by the fluid pressure applied at its left end against the action of the compression coil spring 103 thereby intercepting communication between the ports 105 and 102. In this condition, therefore, fluid pressure does not appear in the port 109 of the restrict valve 91 regardless of the level of the governor pressure and, therefore, neither the port 110 nor the port 111 of the restrict valve 92 is supplied with fluid pressure. If the vehicle speed increased under this condition so high that the governor pressure acting in the port 98 of the restrict valve 92 reaches a second pressure which is higher than the first pressure which shifts the valve spool 95 of the restrict valve 91 upward, the valve spool 96 is shifted upward against the action of the compression coil spring 94. In this condition, the fluid pressure supplied from the port 106 of the change-over valve 101 through the passage 107 to the port 108 is transmitted through the port 112 and the passage 69 to the port 68 of the lock-up clutch control valve 55, whereby in the same manner as before, the valve body 58 is biased upward thereby establishing the direct mechanical transmission by the lock-up clutch while by-passing the torque converter.

Figure 4:
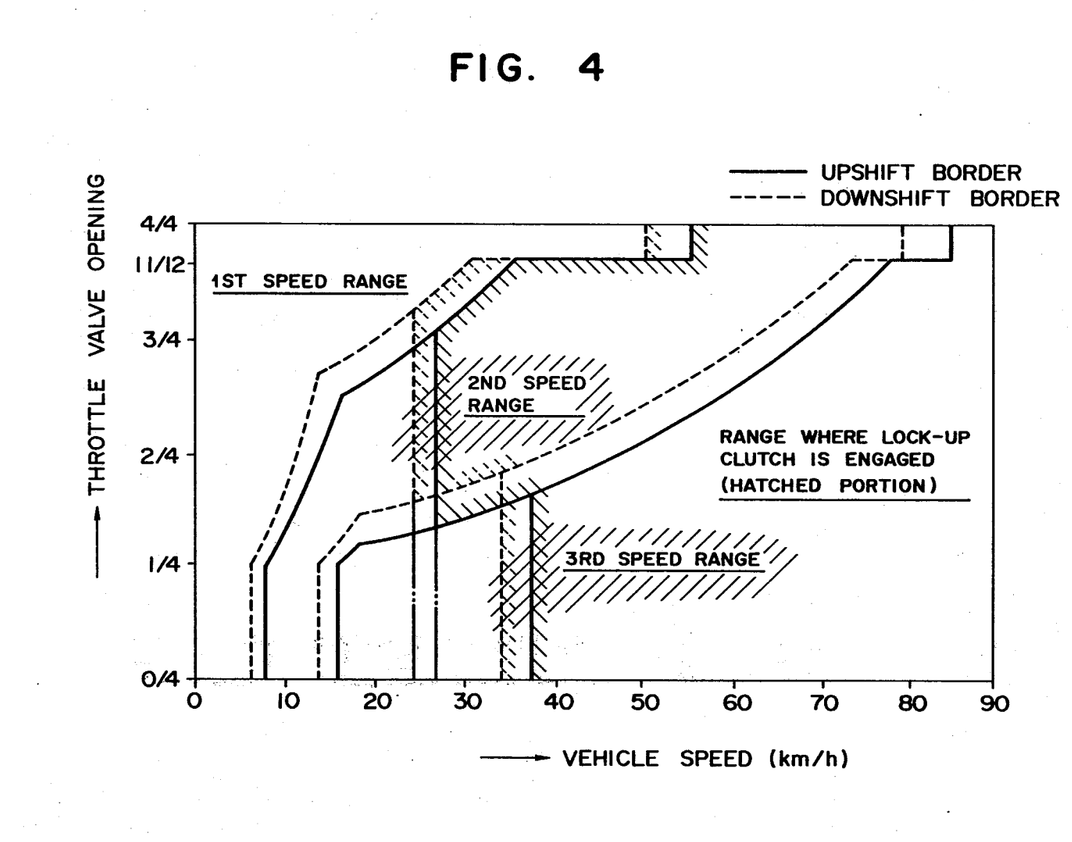

Therefore, in the embodiment shown in FIG. 3, as shown in FIG. 4, the operational range of the lock-up clutch is limited within a region above the 2nd speed and, furthermore, the lower limit of the vehicle speed for operating the lock-up clutch is altered for the 2nd speed range and the 3rd speed range. In view of the fuel consumption and the exhaust gas purification, it is favorable that the operational range of the lock-up clutch is expanded. However, since the actuation of the lock-up clutch excludes the buffering effect by the torque converter, if the vehicle is driven at a low speed with the transmission being shifted to a higher speed range with the lock-up clutch being actuated, the problem of engine stoppage or knocking will be caused. Therefore, it is favorable that the operational range of the lock-up clutch is designed to be in a higher speed range for a higher speed gear shifting position than the speed range for a lower speed gear shifting position. In the embodiment shown in FIG. 3, the temporary disengagement of the lock-up clutch in the shifting between the 2nd speed range and the 3rd speed range in the speed range period above the individual lower speed limit for the 2nd speed and 3rd speed is accomplished substantially in the same manner as that explained with reference to FIG. 1. In the embodiment shown in FIG. 1, the level of the governor pressure at which the valve body 73 of the restrict valve 70 is shifted upward, i.e., the lower limit of the vehicle speed above which the lock-up clutch is actuated, may be set at an optional vehicle speed in the range including the 1st speed range. In this case, of course, only one value can be set as the lower limit.

Although the present invention has been illustrated and explained in the form of two preferred embodiments in the above, it will be understood that various modifications can be made with these embodiments by those skilled in the art without departing from the spirit of the present invention.

We claim:

1. In a fluid pressure control system for a hydraulic transmission with a lock-up clutch of the type which comprises a hydraulic transmission for hydraulically coupling an input member with an output member, a lock-up clutch for directly mechanically coupling said input member with said output member and a fluid passage for selectively supplying fluid pressure to said lock-up clutch, wherein said clutch is adapted to effect direct mechanical coupling of said input and output members when fluid pressure is supplied through said fluid passage, said system comprising a fluid pressure source, a lock-up clutch control valve having at least one actuating port and being adapted to take a first shift condition of connecting said fluid passage with said fluid pressure source and a second shift condition of connecting said fluid passage with an exhaust passage according to whether or not a fluid pressure is supplied to an actuating port, a change-over valve which makes a selection between two control fluid pressures for actuating friction engaging means of the transmission and delivers one of said two control fluid pressures to a second fluid passage connected to said actuating port of said lock-up clutch control valve in a changing-over manner of traversing an intermediate stage where the supplies of said two control fluid pressures are both substantially intercepted, and a restrict valve provided in said second fluid passage so as to selectively intercept said second fluid passage, said restrict valve being constantly supplied with a governor pressure so as to be actuated by said governor pressure in a manner of being kept closed to intercept said second fluid passage when said governor pressure is below a predetermined level and of being kept opened to communicate said second fluid passage when said governor pressure is above a predetermined level.

2. In a fluid pressure control system for a hydraulic transmission with a lock-up clutch of the type which comprises a hydraulic transmission for hydraulically coupling an input member with an output member, a lock-up clutch for directly mechanically coupling said input member with said output member and a fluid passage for selectively supplying fluid pressure to said lock-up clutch, wherein said clutch is adapted to effect direct mechanical coupling of said input and output members when fluid pressure is supplied through said fluid passage, said system comprising a fluid pressure source, a lock-up clutch control valve having at least one actuating port and being adapted to take a first shift condition of connecting said fluid passage with said fluid pressure source and a second shift condition of connecting said fluid passage with an exhaust passage according to whether or not a fluid pressure is supplied to said actuating port, a change-over valve which controls a supply of first and second control fluid pressures for actuating friction engaging means of the transmission in a selective manner of supplying one of said two control fluid pressures at a time, and a restrict valve composite including first and second restrict valves which receives the supply of a selected one of said two control fluid pressures from said change-over valve and delivers said selected control fluid pressure to said actuating port of said lock-up clutch control valve, said first and second restrict valves being constantly supplied with a governor pressure so as to be actuated by said governor pressure in a manner of delivering said first control fluid pressure when said governor pressure is above a first predetermined level and of delivering said first or second control fluid pressure when said governor pressure is above a second predetermined level which is higher than said first predetermined level, wherein the delivery of said first or second control fluid pressure is changed over by a one way shifting of said change-over valve and said second restrict valve in a manner of traversing an intermediate stage where the deliveries of said first and second control fluid pressures are both substantially intercepted.

* * * * *